UNITED STATES PATENT OFFICE.

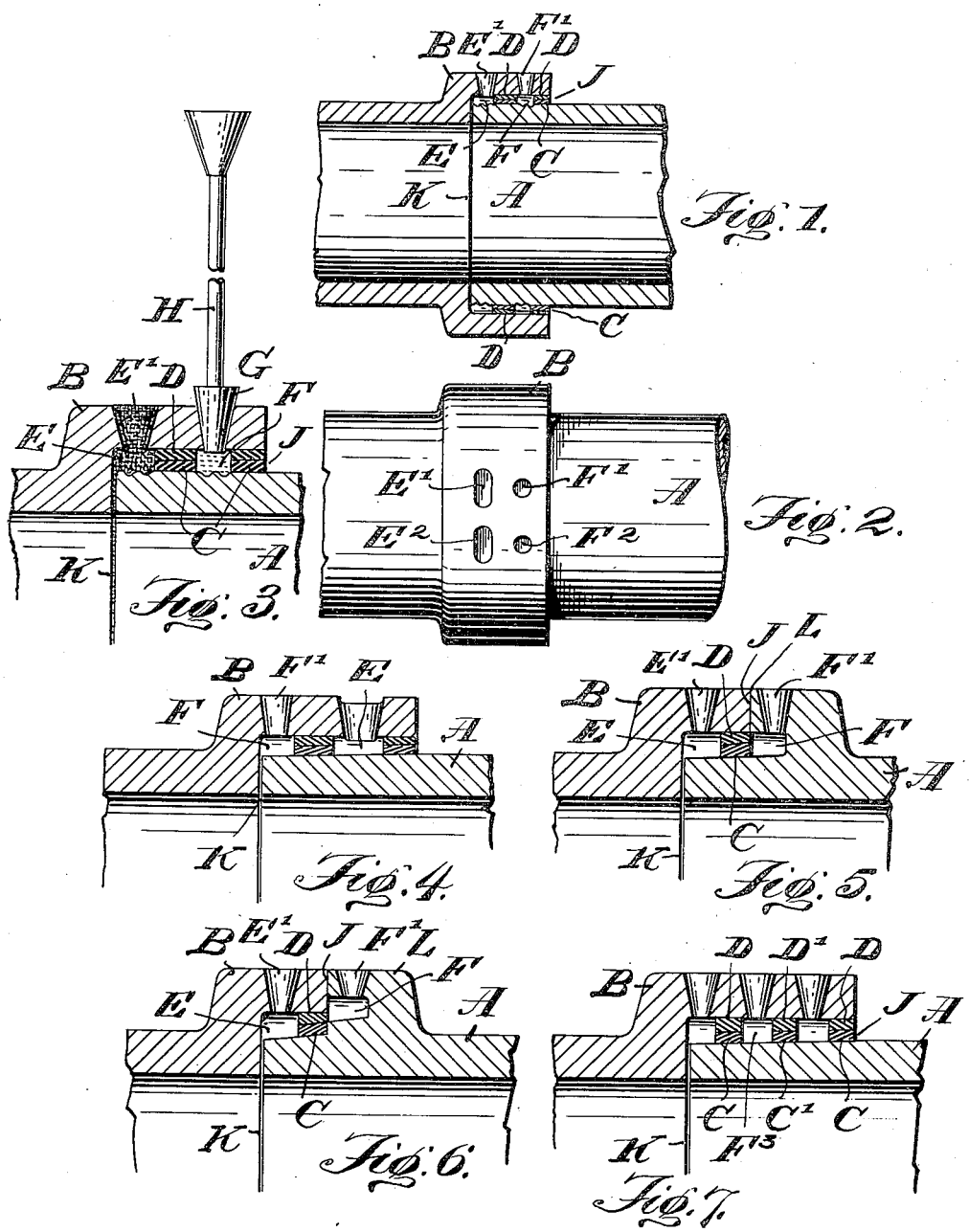

CHARLES J. LOMAX, OF MANCHESTER, ENGLAND.

METHOD OF MAKING A JOINT BETWEEN SPIGOT AND SOCKET PIPES.

No. 868,349.  Specification of Letters Patent.  Patented Oct. 15, 1907.

Application filed July 21, 1906. Serial No. 327,132.

*To all whom it may concern:*

Be it known that I, CHARLES JAMES LOMAX, a subject of the King of Great Britain and Ireland, and a resident of Manchester, in the county of Lancaster, England, have invented a new and useful Method of Making a Joint Between Spigot and Socket Pipes, of which the following is a specification.

These improvements relate to spigot and socket sanitary and similar pipes of that type in which a packing or jointing ring of cement, composition, or the like is run into an annular space or cavity formed within the joint of such pipes.

The object of this invention is to provide means for easily testing the water or gas tightness of such a jointing ring and of supplementing it by a further jointing ring or further jointing rings. For this purpose two or more separate annular spaces or cavities each with its own inlet are provided within the jointing parts of the pipes. In making a joint one annular space is filled with cement in the usual manner, and the other is then filled with air, water, or other suitable fluid, if necessary under pressure. If there is no flow or escape of the fluid the cement jointing ring already made is tight, but if the joint is faulty a flow takes place through it. After testing, the second annular space is filled with cement to form a second supplementary jointing ring.

Figure 1 of the drawings shows in section the two contiguous ends of two lengths of pipe ready for jointing. Fig. 2 illustrates the same part in plan. Fig. 3 illustrates the mode of testing such a joint. Fig. 4 illustrates in section part of a joint which is slightly modified from Fig. 1. Figs. 5, 6, and 7 show in section parts of still further modified joints.

As will be seen on referring to the drawings, the opposed surfaces of the spigot A and the socket B are formed respectively with a ring or with rings C, and with a ring or with rings D. When the spigot and socket are conjoined the rings C come against and within the rings D and make joint. These rings may be in any suitable material, and may for example be of bitumen as is common when a simple cement holding annular cavity only is produced.

In the form of joint illustrated by Figs. 1, 2, and 3, two annular spaces E and F are formed extending around the joint when the spigot and socket are properly placed together, and each annular space is provided with its own inlet or inlet and outlet. $E^1$ and $E^2$ are openings leading to the annular space E, and $F^1$, $F^2$ are openings leading to the annular space F.

With the parts properly assembled as in Figs. 1 and 3 the cement or like sealing or packing material is run into the annular space E through one or other of the openings $E^1$ or $E^2$ until such annular space is filled. When such space is filled and the cement is properly set, the tightness of the joint formed may be tested by filling the annular space F with water under slight pressure. To do this a tapered plug G having a pipe H tightly passing through it may be inserted into the hole $F^1$. See Fig. 3. The outer end of the pipe extends upwards sufficiently to give the desired head, and water is passed into it until the annular space F is filled and the water overflows through hole $F^2$. The hole $F^2$ is now plugged up. Should any further flow of water take place, which would be easily observed in the filled pipe H the cement jointing ring formed in and filling the space E is faulty. If no further flow takes place the joint in E is tight. The outer part of the spigot and socket joint indicated at J is of course luted as is usual in making spigot and socket joints so that no leakage can take place in that direction.

Other fluid than water can be similarly used for testing.

After the test is completed the annular space F may be filled with cement so that a supplementary jointing ring is formed therein.

The extreme end of the spigot may be covered with a plastic cementing material so that when it is forced up against the socket a tight joint is formed along the line K which prevents any cement entering into the pipe.

In the modification shown in Fig. 4 the position of the annular space is reversed, that, E, for the first cement ring, being nearer the outer end of the socket. The end of the spigot must be sealed against the inner face of the socket at K when the testing annular space is as shown in Fig. 4, otherwise the testing liquid would escape or pass into the pipe.

As shown in Fig. 5 the engaging and jointing parts of pipes may be so formed and disposed that the two required annular spaces E and F may be formed by the use and conjunction of only two rings C and D, one C attached to the spigot and the other D attached to the socket. The spigot end of the pipe is provided with what may be termed a cylindrical flange L the outer edge of which is presented to or comes against the edge of the socket when the pipe ends are in place. This cylindrical flange contains or produces the annular cavity F when the pipe ends are put together to form a joint. Either of the annular spaces may first be filled with cement, the joints at K or J being luted as required to prevent leakage, and the other space used for testing.

A still further modification which is self explanatory is illustrated by Fig. 6.

Fig. 7 shows how three annular spaces may be formed, the extra rings $C^1$, $D^1$, forming a third annular space $F^3$ which is also furnished with its own inlet or inlet and outlet. Any two of these annular spaces may first be filled with cement and the third be used for testing, such third ring being afterwards filled with cement if desired. Or one of the end annuar spaces may first be filled with cement and tested through the medium of the central testing space. This central space may then be filled with cement and be tested through the remaining annular space, which may be afterwards itself filled with cement.

Other numbers of annular spaces may be provided and a number be filled with cement and one used for testing, and the annular spaces may be otherwise produced than in the manner described. For example, the rings C and D at the outer end of the socket shown in Figs. 1 and 3 may be dispensed with as fixed or permanent parts of the pipes and may be substituted by gaskets, luting, or packing which is put into place after the ends of the pipes are placed together, such luting then forming one wall of and completing the annular space F, and acting in the same manner as do the rings C and D.

I claim:—

The method of making a joint between spigot and socket pipes which consists in running cement into the form of an annular ring in such joint, testing the tightness of such cement ring by means of fluid under pressure in a continuous annular recess adjacent thereto, and finally running cement into said recess which was used for testing.

In testimony whereof I have signed my name to this specification in the presence of two subscribing witnesses.

CHARLES J. LOMAX.

Witnesses:
WILLIAM GEO. HEYS,
J. O'CONNELL.